US012273287B2

United States Patent
Yuan et al.

(10) Patent No.: US 12,273,287 B2
(45) Date of Patent: Apr. 8, 2025

(54) INFORMATION TRANSMISSION METHOD AND APPARATUS, COMMUNICATION DEVICE, COMMUNICATION NODE AND COMPUTER-READABLE STORAGE MEDIUM

(71) Applicant: ZTE Corporation, Shenzhen (CN)

(72) Inventors: Zhifeng Yuan, Shenzhen (CN); Qiujin Guo, Shenzhen (CN); Weimin Li, Shenzhen (CN); Yuzhou Hu, Shenzhen (CN); Jianqiang Dai, Shenzhen (CN); Hong Tang, Shenzhen (CN); Jian Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 357 days.

(21) Appl. No.: 17/424,061

(22) PCT Filed: Jan. 13, 2020

(86) PCT No.: PCT/CN2020/071791
§ 371 (c)(1),
(2) Date: Jul. 19, 2021

(87) PCT Pub. No.: WO2020/147682
PCT Pub. Date: Jul. 23, 2020

(65) Prior Publication Data
US 2022/0123888 A1   Apr. 21, 2022

(30) Foreign Application Priority Data
Jan. 18, 2019   (CN) .......................... 201910049877.2

(51) Int. Cl.
*H04L 5/00* (2006.01)

(52) U.S. Cl.
CPC .................................. *H04L 5/0048* (2013.01)

(58) Field of Classification Search
CPC ... H04L 5/0048; H04L 5/0023; H04L 5/0053; H04L 5/0094; H04L 5/006; H04W 74/002; H04W 74/0833
(Continued)

(56) References Cited

U.S. PATENT DOCUMENTS

2021/0234571 A1 *   7/2021   Wang .................... H04L 1/0009

FOREIGN PATENT DOCUMENTS

| CN | 102783110 A | * 11/2012 | ........... H04L 1/0026 |
| CN | 107332796 A | * 11/2017 | ........... H04B 1/7103 |

(Continued)

OTHER PUBLICATIONS

International Search Report for corresponding application PCT/CN2020/071791 filed Jan. 13, 2020; Mail date Mar. 27, 2020.

*Primary Examiner* — Hashim S Bhatti
*Assistant Examiner* — Oladiran Gideon Olaleye
(74) *Attorney, Agent, or Firm* — CANTOR COLBURN LLP

(57) ABSTRACT

Provided are an information transmission method and apparatus, a communication device, a communication node and a computer-readable storage medium. The method includes that: a communication device determines a second signal according to N bits in first information, wherein the second signal includes at least one of a preamble and a Reference Signal (RS), and N is an integer greater than or equal to 1; and the communication device sends a message A including the second signal.

15 Claims, 7 Drawing Sheets

(58) Field of Classification Search
USPC .......................................................... 370/329
See application file for complete search history.

(56) References Cited

FOREIGN PATENT DOCUMENTS

| | | | |
|---|---|---|---|
| CN | 108282899 A | 7/2018 | |
| CN | 108781463 A | 11/2018 | |
| CN | 110535602 A | 12/2019 | |
| TW | 201334610 A * | 8/2013 | ........... H04L 1/0026 |
| WO | WO-2012092714 A1 * | 7/2012 | |
| WO | WO-2017144012 A1 * | 8/2017 | |
| WO | 2018127505 A1 | 7/2018 | |
| WO | WO-2018135640 A1 * | 7/2018 | |
| WO | WO-2018202017 A1 * | 11/2018 | |

* cited by examiner

INFORMATION TRANSMISSION METHOD AND APPARATUS, COMMUNICATION DEVICE, COMMUNICATION NODE AND COMPUTER-READABLE STORAGE MEDIUM

CROSS-REFERENCE TO RELATED APPLICATION

The present disclosure is a National Stage Filing of PCT International Application No. PCT/CN2020/071791 filed on Jan. 13, 2020, which claims priority to Chinese Patent Application No. 201910049877.2 filed to the China National Intellectual Property Administration on Jan. 18, 2019, the present disclosure of which is hereby incorporated by reference in its entirety.

Technical Field

Embodiments of the present disclosure relate to an information transmission method and apparatus, a communication device, a communication node and a computer-readable storage medium.

BACKGROUND

In a Long Term Evolution (LTE) and the 5th Generation mobile communication system (5G) New Radio Access Technology (NR) communication system, to receive downlink data, User Equipment (UE) needs to obtain downlink synchronization with a cell after a cell search procedure. Similarly, the UE can perform uplink transmission only after obtaining uplink synchronization with the cell. After completing the uplink and downlink synchronization, the UE enters a Radio Resource Control (RRC) connection state. The UE establishes a connection with the cell and obtains the uplink synchronization through a random access procedure by using a Random Access Channel (RACH).

The main uses of the random access procedure include: 1) obtaining the uplink synchronization; and 2) assigning a unique identity to the UE. There are two ways in which the random access procedure is performed, that is, contention based random access procedure and contention-free based random access procedure. For the contention based random access procedure, in cases where a determined preamble sequence and/or a Reference Signal (RS) is not configured in advance, multiple UEs select randomly a sequence from a candidate sequence pool to initiate random access, and only the UE that wins in the contention resolution can establish a connection with an evolved NodeB (eNodeB) to obtain the uplink synchronization. The whole procedure includes the following four operations, as shown in FIG. 1.

At operation 1, the UE sends a preamble. Specifically, the UE sends a preamble to the eNodeB on a corresponding Physical Random Access Channel (PRACH) resource, so as to inform the eNodeB that there is a random access request and enable the eNodeB to estimate a transmission delay between the eNodeB and the UE and calibrate uplink timing according to the estimated transmission delay. It is to be noted that a time-frequency position of the preamble determines the value of a Random Access-Ratio Network Temporary Identifier (RA-RNTI). After sending the preamble, the UE monitors a corresponding Physical Downlink Control Channel (PDCCH) in a Random Access Response (RAR) time window according to the RA-RNTI.

At operation 2, the eNodeB sends the RAR. Specifically, when decoding the preamble, the eNodeB obtains the time-frequency position of the preamble, and then learns the RA-RNTI required in the RAR, and sends the RAR. If the UE does not receive the RAR replied from the eNodeB in the RAR time window, it is considered that the random access procedure is failed. If the UE successfully receives a RAR in the RAR time window and a preamble index (sequence number) in the RAR is the same as the preamble index sent by the UE, it is considered that the RAR is received successfully, and in such a case the UE stops monitoring the RAR.

At operation 3, the UE sends a message 3 (Msg3). Specifically, the UE transmits the Msg3 on a Physical Uplink Sharing Channel (PUSCH) according to timing adjustment information and uplink data transmission scheduling information sent by the eNodeB. The Msg3 includes a piece of important information, namely identity information of the UE, which is used for the contention resolution in operation 4.

At operation 4, the eNodeB sends contention resolution. Specifically, in a contention resolution mechanism, the eNodeB will carry the identity information in a fed back message 4 (Msg4) to specify the winning UE, and those UEs that do not win in the contention resolution will initiate the random access procedure again.

For the contention-free based random access procedure, the preamble sent by the UE is dedicated for the UE, so there is no conflict; besides, the UE already has a unique Cell-RNTI (C-RNTI) in the cell it accesses, so there is no need for the eNodeB to assign the C-RNTI to the UE, and there is no need to perform operation 3 and operation 4.

In order to simplify the signaling and access procedure, and save the power consumption of the UE, the Radio Access Network 1 (RAN1) working group of the 3rd Generation Partnership Project (3GPP) considers simplifying the above 4-step procedure into a 2-step procedure, and plans to start the protocol development work on this project from January 2019. A random access preamble and data (including the Msg3 and other information) to be sent by the UE are merged into an MsgA (message A), and the Msg2 and the Msg4 fed back or sent by the eNodeB are merged into an MsgB (message B). For a frame structure of the PUSCH transmitted in the MsgA, it can be considered to use the preamble or other RSs, for example, a Sounding Reference Signal (SRS), to perform user detection and timing estimation, that is, in the 2-step access procedure, the UE needs to use the preamble to perform uplink synchronization and more likely to participate in channel estimation, which greatly determines whether the MsgA transmitted in the PUSCH can be correctly decoded.

SUMMARY

The embodiments of the present disclosure provide an information transmission method and apparatus, a communication device, a communication node and a computer-readable storage medium, which may improve the reliability of the transmitted information within a limited time-frequency resource.

The embodiments of the present disclosure provide an information transmission method, which may include the following operations.

A communication device determines a second signal according to N bits in first information, wherein the second signal includes at least one of a preamble and an RS, and N is an integer greater than or equal to 1.

The communication device sends an MsgA including the second signal.

The embodiments of the present disclosure provide an information transmission method, which may include the following operations.

A communication node receives an MsgA including a second signal, which is sent by a communication device, wherein the second signal includes at least one of a preamble and an RS.

The communication node determines information of N bits in first information of the communication device according to the second signal.

The embodiments of the present disclosure provide an information transmission apparatus, which may include a first determining module and a sending module.

The first determining module is configured to determine a second signal according to N bits in first information, wherein the second signal includes at least one of a preamble and an RS, and N is an integer greater than or equal to 1.

The sending module is configured to send an MsgA including a second signal.

The embodiments of the present disclosure provide an information transmission apparatus, which may include a receiving module and a second determining module.

The receiving module is configured to receive an MsgA including a second signal, which is sent by a communication device, wherein the second signal includes at least one of a preamble and an RS.

The second determining module is configured to determine information of N bits in first information of the communication device according to the second signal.

The embodiments of the present disclosure provide a communication device, which may include: a memory, a processor and a computer program which is stored on the memory and capable of running on the processor. The processor is configured to implement, when executing the program, the information transmission method.

The embodiments of the present disclosure provide a communication node, which may include: a memory, a processor and a computer program which is stored on the memory and capable of running on the processor. The processor is configured to implement, when executing the program, the information transmission method.

The embodiments of the present disclosure provide a computer-readable storage medium storing a computer-executable instruction. The computer-executable instruction is used for performing the information transmission method.

According to the embodiments of the present disclosure, a communication device determines a second signal according to N bits in first information, wherein the second signal includes at least one of a preamble and an RS, and N is an integer greater than or equal to 1; and the communication device sends an MsgA including a second signal. Through the embodiments of the present disclosure, a bit rate can be reduced, the reliability of transmission can be improved, and the collision probability of the preamble or the RS among various communication devices can be reduced.

DETAILED DESCRIPTION

The embodiments of the present disclosure are elaborated below in combination with the accompanying drawings.

These operations shown in the flowchart of the accompanying drawings can be executed in a computer system like a group of computer executable instructions. Moreover, although a logical sequence is shown in the flowchart, in some cases, the shown or described operations can be performed in a sequence different from that described herein.

The embodiments of the present disclosure provide an information transmission method which can improve the reliability of the transmitted information in a 2-step random access procedure. The information transmission method may be applied to a communication system like the LTE communication system and the NR communication system. For example, the information transmission method may be applied to a 5G mobile communication system or other wireless or wired communication systems.

Figure 1:
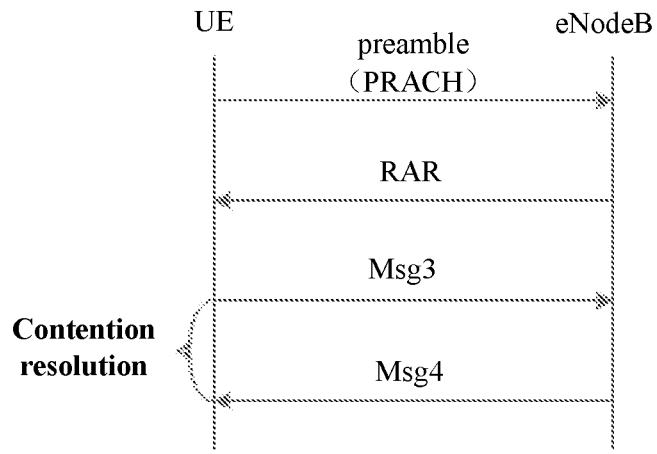
FIG. 1 is a schematic diagram of a 4-step random access procedure.
Figure 2:
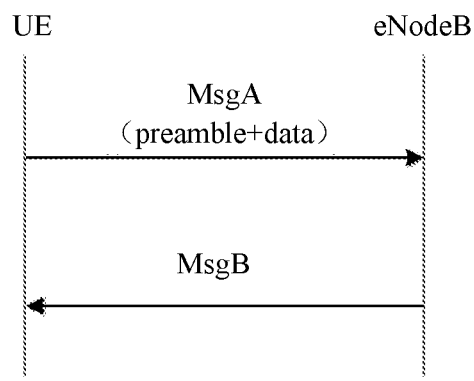
FIG. 2 is a schematic diagram of a 2-step random access procedure.
Figure 3:
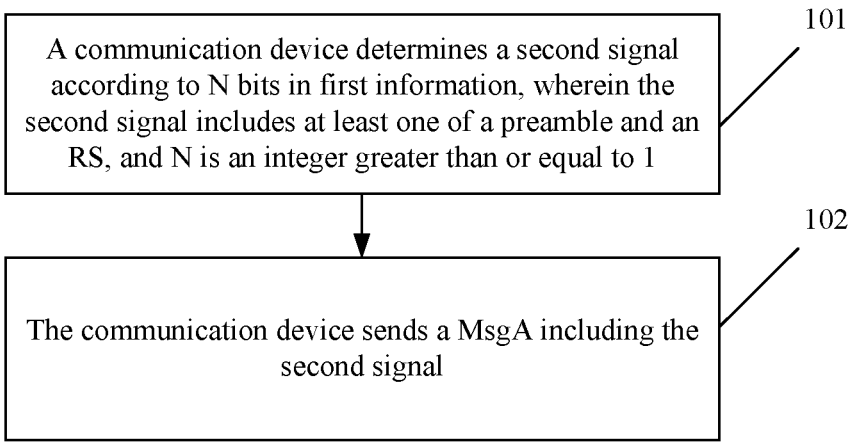
FIG. 3 is a flowchart of an information transmission method (applied to a communication device) according to some embodiments of the present disclosure.

As shown in FIG. 3, the information transmission method in the embodiments of the present disclosure includes the following operations.

At operation 101, a communication device determines a second signal according to N bits in first information, wherein the second signal includes at least one of a preamble and an RS, and N is an integer greater than or equal to 1.

The communication devices may include: a mobile device, an access terminal, a user terminal, a user station, a user unit, a mobile station, a remote station, a remote terminal, a user agent, a user device, a user device, or other similar devices.

The first information may be information for a random access procedure.

In some embodiments, the first information includes at least one of: identity information of the communication device, uplink control information, and downlink beam information captured by the communication device.

The identity information may be a random number that can uniquely identify each communication device and occupies a fixed number of bits.

For example, if the length of the first information is denoted as M, then the number of bits of the identity information of the communication device is M1, which is less than or equal to M, the number of bits of the uplink control information is M2, which is less than or equal to M, and the sum of M1 and M2 is equal to M.

In some embodiments, the value of N is related to at least one of a length L of the second signal, the number S of available preamble sequences and/or available RS sequences, and a length M of the first information.

The N bits may be selected by the following ways: starting from the first bit of the first information, N consecutive bits are selected successively from front to back; starting from the last bit of the first information, N consecutive bits are selected successively from back to front; starting from the first bit of the first information, n bits are selected at intervals of δ bits from front to back until N bits are selected; starting from the last bit of the first information, n bits are selected at intervals of δ bits from back to front until N bits are selected. δ is a positive integer less than M-N and has a functional relationship with N, where n≤N-1.

Bit sequences of the first information include: $\{L_0, L_1, \ldots, L_{M-1}\}$. Starting from the first bit of the first information is starting from $L_0$, and starting from the last bit of the first information is starting from $L_{M-1}$.

The N bits may also be selected by the following ways: the N bits are selected from the identity information of the communication device; the N bits are selected from the uplink control information; the N bits are selected from the downlink beam information captured by the communication device; N1 bits, N2 bits and N3 bits are selected respectively from the identity information of the communication device, the uplink control information and the downlink beam information captured by the communication device. N1, N2 and N3 are integers, and the sum of N1, N2 and N3 is not greater than N.

In some embodiments, the value of N is determined by at least one of: the value of N is equal to a value obtained by rounding up or rounding down $\log_2 L$, that is, a logarithm base 2 of the length L of the second signal; the value of N is equal to a value obtained by rounding up or rounding down $\log_2 S$, that is, a logarithm base 2 of the number S of the available preamble sequences and/or available RS sequences; the value of N is not less than a value obtained by $\log_2 M$, rounding up or rounding down $\log_2 M$, that is, a logarithm base 2 of the length M of the first information.

The value of N may also follow the following rules: in cases where the number S of the sequences is a power of 2, each state of the N bits can uniquely indicate a preamble or RS sequence. In cases where the number of the sequences is in the range of $(2^{x-1}, 2^x)$ (where x-1 is equal to a value obtained by rounding down $\log_2 S$, and x is equal to a value obtained by rounding up $\log_2 S$), then there are three methods to represent the preamble or RS sequence.

1) x-1 bits are selected to determine indexes of S preambles or RS sequences, wherein every two of $2\times(S-2^{x-1})$ preambles or RS sequences are indicated using the same x-1 bit value.

2) x bits are selected to determine indexes of S preambles or RS sequences, wherein in a case where the x bit value is greater than the maximum index value, the x bits are shifted right by one bit, and it is needed to add indication information of 1 bit to the second signal to indicate whether the N bits are shifted right by one bit.

3) x-1 bits are selected to determine indexes of S preambles or RS sequences, wherein the x-1 bits are used for representing the first $2^{x-1}$ indexes, and the other $2\times(S-2^{x-1})$ indexes are represented by a Cyclic Redundancy Check (CRC) mask.

In some embodiments, the number S of the available preamble sequences and/or available RS sequences is equal to 2 to the power of m, where m is a positive integer.

In some embodiments, in a case where the second signal includes the preamble, the index of the preamble sequence in the sequence pool may be determined according to the N bits, and then the preamble is determined according to the index.

In some embodiments, in a case where the second signal includes the RS, at least one of the following information used for determining the RS is determined according to the N bits: an Orthogonal Cover Code (OCC) participating in generation of the RS; a type of the RS and an OCC participating in generation of the RS; a type of the RS, a Code Division Multiplexing (CDM) group identifier, and an OCC participating in generation of the RS; a port number of the RS; a type of the RS and a port number of the RS; extended RS information corresponding to the RS; and a type of the RS and extended RS information corresponding to the RS. The extended RS information includes: a port number of the RS, an extension factor and a position of extended element.

At operation 102, the communication device sends an MsgA including the second signal.

In the embodiments of the present disclosure, because the second signal carries part of the first information, the communication node receiving the MsgA not only obtains the preamble and/or RS, but also obtains part of the information used for the random access procedure, which reduces PRACH information to be transmitted by the communication device, thereby reducing the bit rate and improving the reliability of transmission. Moreover, because the N bits are selected from the first information, which is usually different for different communication devices, the collision probability of the preamble or the RS among various communication devices can be reduced.

Figure 4:
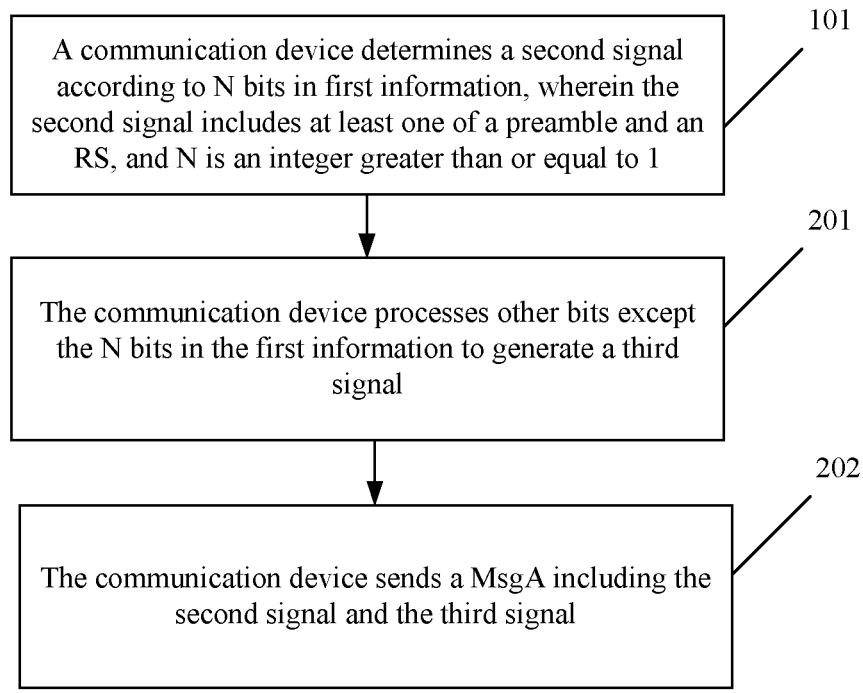
FIG. 4 is a flowchart of an information transmission method (applied to a communication device) according to some other embodiments of the present disclosure.

FIG. 4 shows some other embodiments of the present disclosure. After operation 101, the method may further include the following operations.

At operation 201, the communication device processes other bits except the N bits in the first information to generate a third signal.

For example, the other bits except the N bits in the first information may be encoded and mapped to obtain the third signal.

In some embodiments, the communication device encodes the other bits except the N bits in the first information, modulates the encoded bits through Binary Phase Shift Keying (BPSK), or π/2 BPSK, or Quadrature Phase Shift Keying (QPSK) to obtain a modulation symbol Q, and obtains the third signal according to the modulation symbol Q.

In some other embodiments, the communication device performs coding and modulation on the other bits except the N bits in the first information to obtain a modulation symbol Q, extends the modulation symbol Q to obtain an extension block SS, and obtains the third signal according to the extension block SS.

The operation that the communication device extends the modulation symbol Q to obtain the extension block SS may be implemented according to the following formula: $SS^{(l)} = Q \cdot C_x^{(l)}$, $1 \in [1, K]$ or $l \in [0, K-1]$, where $C_x$ is an extended sequence adopted by the communication device, K is the length of the extended sequence $C_x$, Q is the modulation symbol, and $SS^{(l)}$ is obtained by the dot product of the modulation symbol Q and the l-th element in the extended sequence.

At operation 202, the communication device sends the MsgA including the second signal and the third signal.

The MsgA may include two parts. The first part is the second signal, namely the preamble and/or the RS, and the information is obtained according to the N bits in the first information. The second part is the third signal, and the information is obtained according to the other bits except the N bits in the first information.

Figure 5:
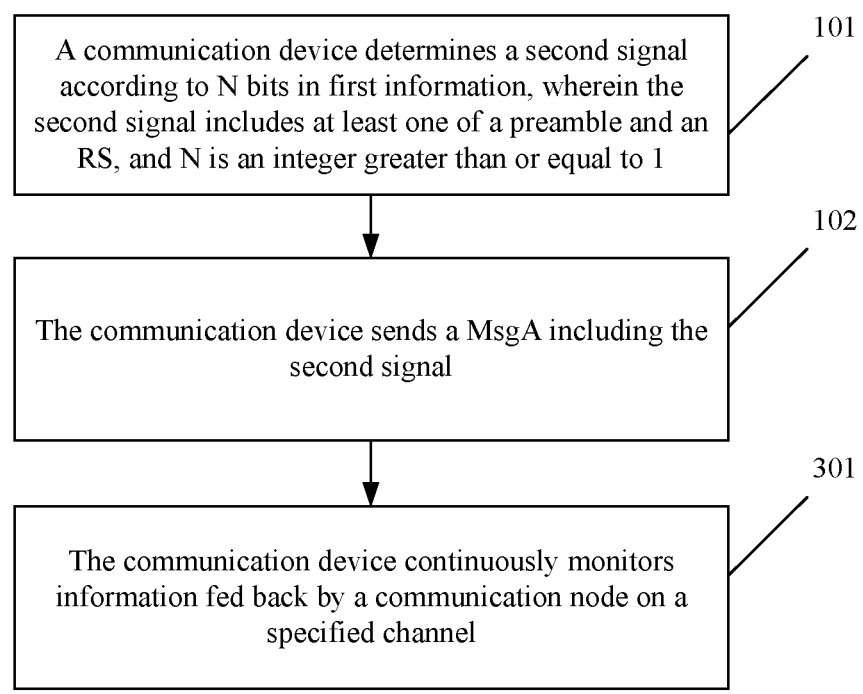
FIG. 5 is a flowchart of an information transmission method (applied to a communication device) according to yet other embodiments of the present disclosure.

As shown in FIG. 5, in some other embodiments, after operation 102 or operation 202, the method may further include the following operations.

At operation 301, the communication device continuously monitors information fed back by the communication node on a specified channel.

The specified channel may be a PRACH or any other scheduled channel.

The communication device may obtain, by monitoring, the MsgB fed back by the communication node, thus completing the access procedure.

Figure 6:
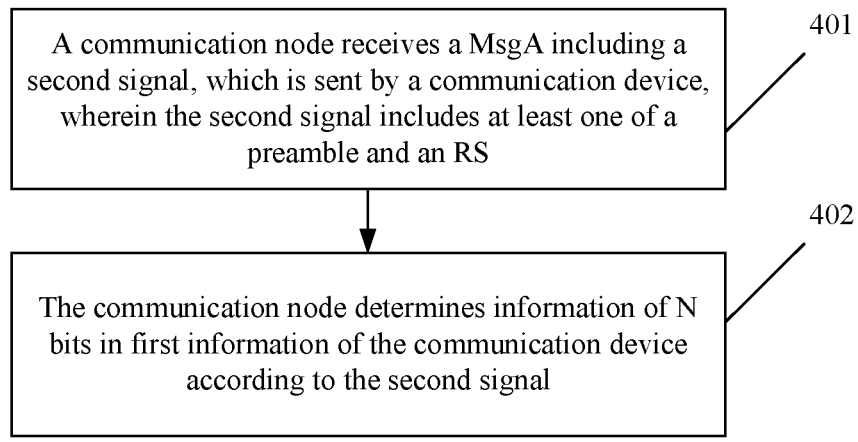
FIG. 6 is a flowchart of an information transmission method (applied to a communication node) according to some embodiments of the present disclosure.

For a communication node, as shown in FIG. 6, the embodiments of the present disclosure provide an information transmission method, which includes the following operations.

At operation 401, a communication node receives an MsgA including a second signal, which is sent by a communication device, wherein the second signal includes at least one of a preamble and an RS.

At operation 402, the communication node determines information of N bits in first information of the communication device according to the second signal.

The communication node may include: an Access Point (AP), a node B, a Radio Network Controller (RNC), an Evolved Node B (eNB), a Base Station Controller (BSC), a Base Transceiver Station (BTS), a Base Station (BS), a Transceiver Function (TF), a radio router, a radio transceiver, a basic service unit, an extended service unit, a Radio Base Station (RBS) or other similar node or unit.

In the embodiments of the present disclosure, because the second signal carries part of the first information used for the random access procedure, the communication node not only obtains the preamble and/or the RS, but also obtains part of the information used for the random access procedure, which reduces PRACH information to be transmitted by the communication device, thereby reducing the bit rate and improving the reliability of transmission. Moreover, because the N bits are selected from the first information, which is usually different for different communication devices, the collision probability of the preamble or the RS among various communication devices can be reduced.

In some embodiments, the first information includes at least one of: identity information of the communication device, uplink control information, and downlink beam information captured by the communication device.

In some embodiments, the value of N is related to at least one of: a length L of the second signal, the number S of the available preamble sequences and/or available RS sequences, and a length M of the first information.

In some embodiments, the value of N is determined by at least one of: the value of N is equal to a value obtained by rounding up $\log_2 L$ or rounding down $\log_2 L$; the value of N is equal to a value obtained by rounding up $\log_2 S$ or rounding down $\log_2 S$; and the value of N is not less than a value obtained by $\log_2 M$, rounding up $\log_2 M$ or rounding down $\log_2 M$.

The value of N may also follow the following rules: if the number S of the sequences is a power of 2, each state of the N bits can uniquely indicate a preamble or RS sequence. In cases where the number of the sequences is in the range of $(2^{x-1}, 2^x)$ (where x-1 is equal to a value obtained by rounding down $\log_2 S$, and x is equal to a value obtained by rounding up $\log_2 S$), then there are three methods to represent the preamble or RS sequence.

1) x-1 bits are selected to determine indexes of S preambles or RS sequences, wherein every two of $2 \times (S-2^{x-1})$ preambles or RS sequences are indicated using the same x-1 bit value.
2) x bits are selected to determine indexes of S preambles or RS sequences, wherein in a case where the x bit value is greater than the maximum index value, the x bits are shifted right by one bit, and it is needed to add the indication information of 1 bit to the second signal to indicate whether the N bits are shifted right by one bit.
3) x-1 bits are selected to determine indexes of S preambles or RS sequences, wherein the x-1 bits are used for representing the first $2^{x-1}$ indexes, and the other $2 \times (S-2^{x-1})$ indexes are represented by the CRC mask.

At operation 402, the communication node determines, according to the second signal, information of N bits in first information used by the communication device for random access, which may be considered as an inverse process of determining the second signal according to the N bits in operation 102.

In some embodiments, the second signal includes the preamble, and the operation that the communication node determines the information of the N bits in the first information of the communication device according to the second signal includes the following operation.

The communication node determines an index of the corresponding preamble sequence according to the preamble, and determines the information of the N bits according to the index.

In some embodiments, the second signal includes the RS, and the communication node determines, according to the second signal, at least one of the following information used for determining the information of the N bits: an OCC participating in generation of the RS; a type of the RS and an OCC participating in generation of the RS; a type of the RS, the CDM group identifier, and an OCC participating in generation of the RS; a port number of the RS; a type of the RS and a port number of the RS; extended RS information corresponding to the RS; and a type of the RS and extended RS information corresponding to the RS. The extended RS information includes: a port number of the RS, an extension factor of the RS, and a position of extended element of the RS.

Figure 7:
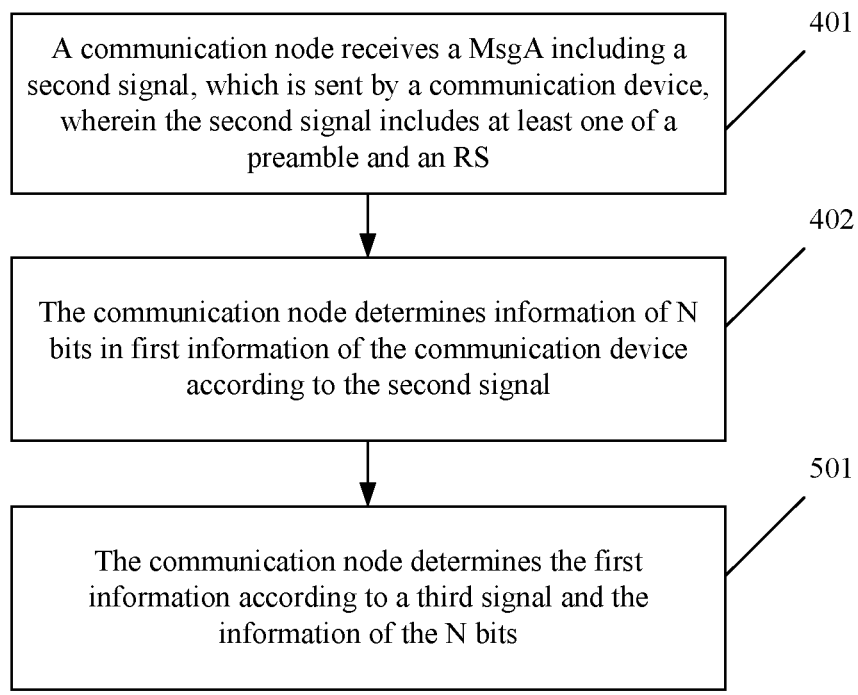
FIG. 7 is a flowchart of an information transmission method (applied to a communication node) according to some other embodiments of the present disclosure.

As shown in FIG. 7, in some embodiments, the MsgA further includes a third signal generated according to other bits except the N bits in the first information. The method may further include operation 501, in which the communication node determines the first information according to the third signal and the information of the N bits.

The communication node may determine the first information with the N bits removed according to the third signal, and then obtain the complete first information according to the N bits.

Figure 8:
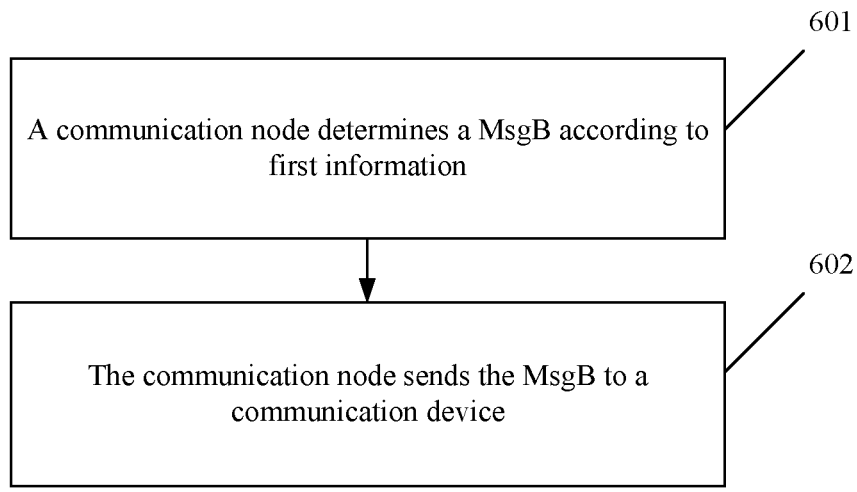
FIG. 8 is a flowchart of an information transmission method (applied to a communication node) according to yet other embodiments of the present disclosure.

As shown in FIG. 8, in some embodiments, after operation 501, the method may further include the following operations.

At operation 601, the communication node determines an MsgB according to the first information. The MsgB includes the identity information of the communication device in the MsgA, which is successfully received by the communication node, and time synchronization information. The time synchronization information may include Timing Advance (TA) and other information.

At operation 602, the communication node sends the MsgB to the communication device.

The communication node sends the MsgB to the communication device, and the communication device receives the MsgB successfully and confirms whether the communication device wins in the contention.

An illustration is given below through some application examples. In the following application examples, the communication device is UE, and the communication node is an eNodeB.

In a first application example, the index of the preamble sequence is determined according to the identity information of the UE.

The method for reducing preamble collision in a 2-step RACH procedure provided by the present application example may be applied to an enhanced Mobile Broadband (eMMB) scenario, an Ultra-Reliable and Low Latency Communications (URLLC) scenario or a massive Machine Type Communications (mMTC) scenario in the LTE and NR communication system, and scenarios of other communication systems.

In the 2-step RACH procedure, the UE transmits an MsgA to obtain uplink synchronization with a cell. The UE may determine the preamble sequence in the following methods, and then sends the MsgA to the eNodeB.
1. The UE selects N bits from a specific position in the identity information and/or control information (that is, the first information).
2. The index of the preamble sequence in the sequence pool is determined using the N bits, thereby determining the preamble (that is, the second signal).
3. The N bits are removed from the identity information of the UE and/or control information, the third signal is obtained after coding and modulation and/or sequence extension, and the second signal and the third signal are combined into the MsgA to be sent to the eNodeB.
4. The eNodeB receives the MsgA and obtains the preamble decoded successfully, obtains the information of the N bits corresponding to the preamble and inserts the information of the N bits into decoded data to obtain the identity information and/or control information.

Figure 9:
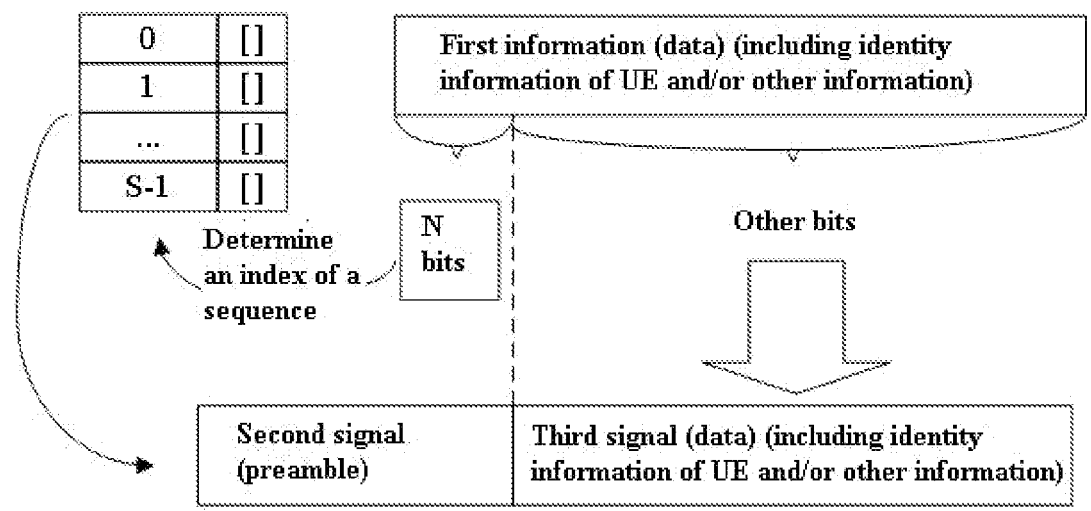
FIG. 9 is a schematic diagram of a first application example of the present disclosure.

For example, in a RRC_INACTIVE state, the identity information sent by the UE is 48 bits. Assuming that the number of the available preamble sequences is 64, which is 2 to the power of 6, then 6 bits need to be selected from the identity information sent by the UE, corresponding to the preamble sequences one to one. For example, in a RRC_CONNECTED state, the identity information sent by the UE is 16 bits. Assuming that the number of the available preamble sequences is 48, which is between 2 to the power of 5 and 2 to the power of 6, then 5 bits need to be selected from the identity information sent by the UE. In all the preamble sequences, there are 32 available preamble sequences, and every two available preamble sequences correspond to one preamble sequence. For example, every two adjacent indexes in the sequence with the indexes 16 to 47 correspond to a N-bit value, or the even-numbered indexes 0 to 31 correspond to the indexes 32 to 47 in a small to large order, and each pair of indexes corresponds to a N-bit value, as shown in FIG. 9.

The indication information is interpreted by taking an example. If the eNodeB receives the preamble sequence corresponding to index 3, then the bits that are selected from the identity information of the UE are "000011".

The indication information is interpreted by taking an example. If the eNodeB receives the preamble sequence corresponding to index 3, then the bits that are selected from the identity information of the UE are "000011".

The identity information of the UE actually transmitted is reduced from 48 bits to 42 bits, and respective UEs that initiate a random access procedure at the same time have different identity information, for example, the last 6 bits of the identity information of respective UEs that initiate an access procedure at the same time are different, which can ensure with great probability that the preambles selected by different UEs are not the same, so the application of the solution not only reduces the bit rate of data and improves the reliability of transmission, but also reduces the probability of preamble collision.

In a second application example, the RS is determined according to the identity information of the UE.

The method for reducing preamble collision in a 2-step RACH procedure provided by the present application example can be applied in the eMBB scenario, the URLLC scenario or the mMTC scenario in the LTE and NR communication system, and the scenarios of other communication systems.

In the 2-step RACH procedure, the UE transmits an MsgA to obtain uplink synchronization with a cell. The UE may determine the RS in the following methods, and then sends the MsgA to the eNodeB.
1. The UE selects N bits from the specific position in the identity information and/or control information (that is, the first information).
2. The RS (that is, the second signal) to be used is determined using the N bits.
3. The N bits are removed from the identity information of the UE and/or control information, the third signal is obtained after coding and modulation and/or sequence extension, and the second signal and the third signal are combined into the MsgA to be sent to the eNodeB.
4. The eNodeB receives the MsgA and obtains the RS, obtains the information of the N bits corresponding to the RS, and inserts the information of the N bits into the decoded data to obtain the identity information and/or control information.

Figure 10:
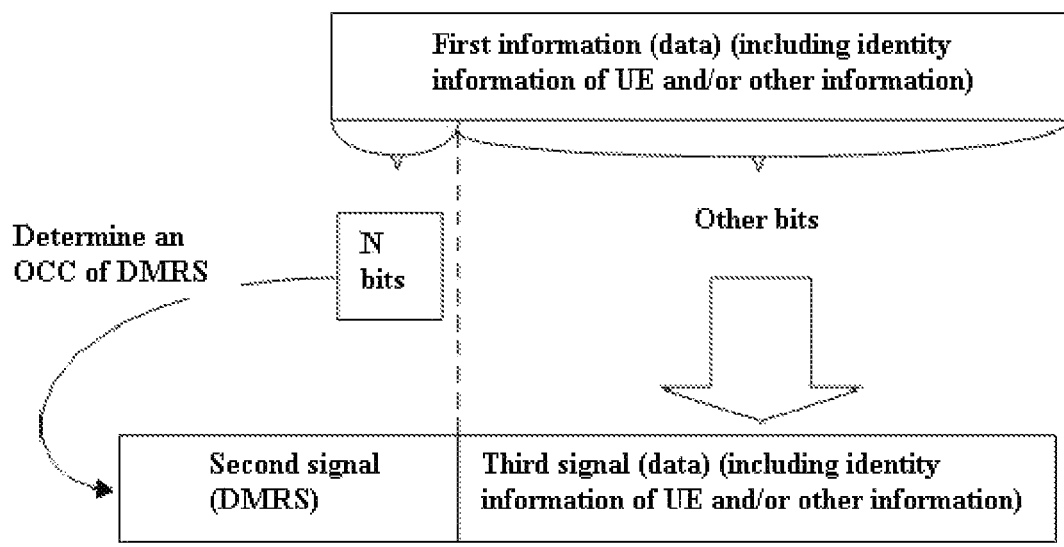
FIG. 10 is a schematic diagram of a second application example of the present disclosure.

For example, in the RRC_INACTIVE state, the identity information sent by the UE is 48 bits. Assuming that the RS is a Demodulation Reference Signal (DMRS), the type 1 (Type1) of DMRS is selected, whose parameter configuration is shown in Table 1. The OCC of time-frequency domain participating in the generation of the DMRS supports a total of 8 mutually orthogonal ports, and all elements in the first column and the third column of all OCC sequences are '+1'. Then, it is only needed to select two bits from the identity information sent by the UE to determine other two elements, for example, '0' indicates the element '−1', and '1' indicates the element '+1', as shown in FIG. 10.

It is to be noted that if the type of DMRS is uncertain, another one bit needs to be added for determining the type of DMRS, for example, '0' indicates Type 1, and '1' indicates Type 2. If a CDM group is uncertain, for Type1, only one bit needs to be added to determine the CDM group; for Type2, one additional bit is used to determine the CDM groups 2 and 4, or no additional bit is used to indicate the CDM group 0.

The indication information is interpreted by taking an example. First it is determined that the indication information is "Type+CDM group+OCC elements 2 and 4". If the DMRS received by the eNodeB is Type1, the CDM group is determined as the CDM group 0, and the OCC is "+1, +1, +1, ±1", then the bits selected from the UE ID are "0011".

The identity information of the UE actually transmitted is reduced from 48 bits to 46 bits or 45 bits or 44 bits, and respective UEs that initiate a random access procedure at the same time have different identity information, for example, the last 4 bits of the identity information of respective UEs that initiate an access procedure at the same time are different, or the last bit of every four bits is inconsistent, which can ensure with great probability that the RSs selected by different UE are not the same, so the application of the solution not only reduces the bit rate of data and improves the reliability of transmission, but also reduces the probability of DMRS collision.

TABLE 1

PUSCH DMRS Type1 parameter configuration

| $\bar{p}$ | CDM group | Δ | $w_f(k')$ | | $w_t(l')$ | |
|---|---|---|---|---|---|---|
| | | | k' = 0 | k' = 1 | l' = 0 | l' = 1 |
| 0 | 0 | 0 | +1 | +1 | +1 | +1 |
| 1 | 0 | 0 | +1 | −1 | +1 | +1 |
| 2 | 1 | 1 | +1 | +1 | +1 | +1 |
| 3 | 1 | 1 | +1 | −1 | +1 | +1 |
| 4 | 0 | 0 | +1 | +1 | +1 | −1 |
| 5 | 0 | 0 | +1 | −1 | +1 | −1 |
| 6 | 1 | 1 | +1 | +1 | +1 | −1 |
| 7 | 1 | 1 | +1 | −1 | +1 | −1 |

TABLE 2

PUSCH DMRS Type2 parameter configuration

| $\bar{p}$ | CDM group | Δ | $w_f(k')$ | | $w_t(l')$ | |
|---|---|---|---|---|---|---|
| | | | k' = 0 | k' = 1 | l' = 0 | l' = 1 |
| 0 | 0 | 0 | +1 | +1 | +1 | +1 |
| 1 | 0 | 0 | +1 | −1 | +1 | +1 |
| 2 | 1 | 2 | +1 | +1 | +1 | +1 |
| 3 | 1 | 2 | +1 | −1 | +1 | +1 |
| 4 | 2 | 4 | +1 | +1 | +1 | +1 |
| 5 | 2 | 4 | +1 | −1 | +1 | +1 |
| 6 | 0 | 0 | +1 | +1 | +1 | −1 |
| 7 | 0 | 0 | +1 | −1 | +1 | −1 |
| 8 | 1 | 2 | +1 | +1 | +1 | −1 |
| 9 | 1 | 2 | +1 | −1 | +1 | −1 |
| 10 | 2 | 4 | +1 | +1 | +1 | −1 |
| 11 | 2 | 4 | +1 | −1 | +1 | −1 |

In the third application example, the port number of the RS is determined according to the identity information of the UE.

The method for reducing preamble collision in a 2-step RACH procedure provided by the present application example can be applied in the eMIBB scenario, the URLLC scenario or the mMTC scenario in the LTE and NR communication system, and the scenarios of other communication systems.

In the 2-step RACH procedure, the UE transmits an MsgA to obtain the uplink synchronization with the cell. The UE may determine the RS in the following methods, and then sends the MsgA to the eNodeB.

1. The UE selects N bits from the specific position in the identity information and/or control information (that is, the first information).
2. The port number (denoted as $\bar{p}$ in Table 1 and Table 2) of the RS to be used is determined using the N bits, thereby determining the RS (that is, the second signal) to be used.
3. The N bits are removed from the identity information of the UE and/or control information, the third signal is obtained after coding and modulation and/or sequence extension, and the second signal and the third signal are combined into the MsgA to be sent to the eNodeB.
4. The eNodeB receives the MsgA and obtains the RS, obtains the information of the N bits corresponding to the RS, and inserts the information of the N bits into the decoded data to obtain the identity information and/or control information.

Figure 11:
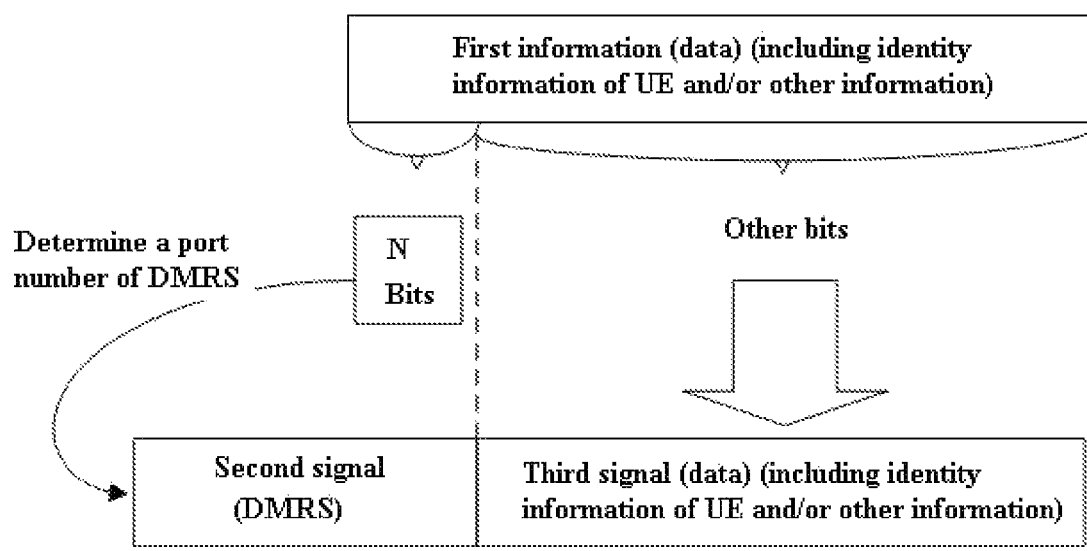
FIG. 11 is a schematic diagram of a third application example of the present disclosure.

For example, in the RRC_INACTIVE state, the identity information sent by the UE is 48 bits. Assuming that the RS is the DMRS, the Type1 of the DMRS is selected, whose parameter configuration is shown in Table 1. The OCC of time-frequency domain participating in the generation of the DMRS supports a total of 8 mutually orthogonal ports. Then, only three bits need to be selected from the identity information sent by the UE to determine the port number, as shown in FIG. 11.

It is to be noted that if the type of DMRS is not fixed, another one bit needs to be added for determining the type of DMRS.

The indication information is interpreted by taking an example. First it is determined that the indication information is "Type+Port". If the DMRS received by the eNodeB is Type1, the port is Port 0, and the OCC is "+1, +1, +1, +1", then the bits selected from the identity information of the UE are "0 000".

The identity information of the UE actually transmitted is reduced from 48 bits to 45 bits or 44 bits, and respective UEs that initiate a random access procedure at the same time have different identity information, for example, the last 4 bits of the identity information of respective UEs that initiate an access procedure at the same time are different, or the last bit of every four bits is inconsistent, which can ensure with great probability that the RSs selected by different UE are not the same, so the application of the solution not only reduces the bit rate of data and improves the reliability of transmission, but also reduces the probability of DMRS collision.

In the fourth application example, the extended RS information is determined according to the identity information of the UE.

The method for reducing preamble collision in a 2-step RACH procedure provided by the present application example can be applied in the eMBB scenario, the URLLC scenario or the mMTC scenario in the LTE and NR communication system, and the scenarios of other communication systems.

In the 2-step RACH procedure, the UE transmits an MsgA to obtain uplink synchronization with a cell. The UE may determine the preamble sequence in the following methods.

1. The UE selects N bits from the specific position in the identity information and/or control information (that is, the first information).

2. The extended RS information to be used is determined using the N bits, thereby determining the RS (that is, the second signal) to be used.
3. The N bits are removed from the identity information of the UE and/or control information, the third signal is obtained after coding and modulation and/or sequence extension, and the second signal and the third signal are combined into the MsgA to be sent to the eNodeB.
4. The eNodeB receives the MsgA and obtains the RS, obtains the information of the N bits corresponding to the RS, and inserts the information of the N bits into the decoded data to obtain the identity information and/or control information.

The so-called extended RS information refers to multiplying the elements in certain one or two columns by '+1' or '−1' based on the OCC in Table 1 and Table 2, or multiplying the elements in certain two columns by '+1', or '−1', or 'i' or '−i' to obtain another group of OCCs that are still orthogonal in the group. These multipliers are called extension factors.

Figure 12:
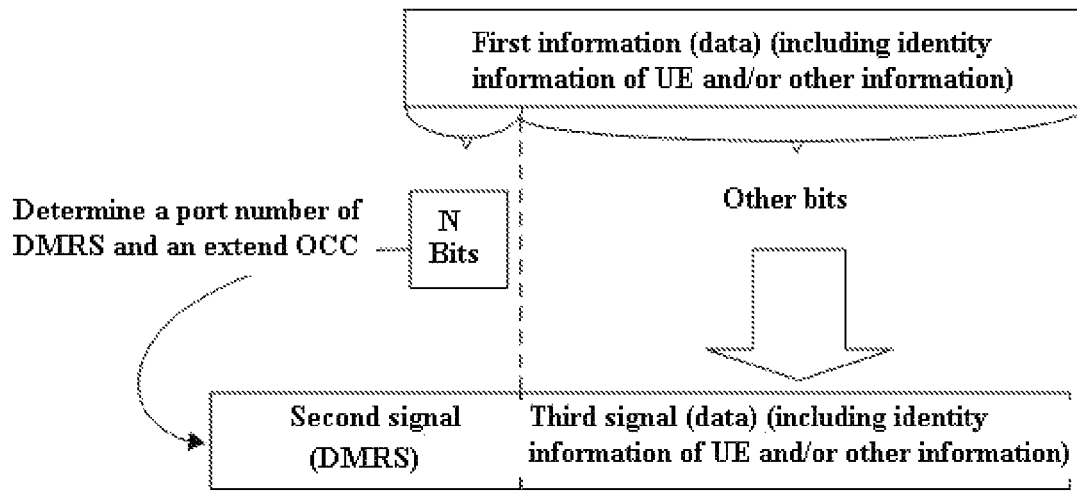
FIG. 12 is a schematic diagram of a fourth application example of the present disclosure.

For example, in the RRC_INACTIVE state, the identity information sent by the UE is 48 bits. Assuming that the RS is the DMRS, the Type1 of the DMRS is selected, whose parameter configuration is shown in Table 1. The OCC of time-frequency domain participating in the generation of the DMRS supports a total of 8 mutually orthogonal ports, and each OCC has four elements, and the elements in the first column and the third column are '+1'. Then, to extend the OCC elements in a certain column, it is only needed to: ① select 3 to 4 bits from the identity information sent by the UE to indicate the port number; ② select two bits from the identity information sent by the UE to determine the position of the element to be extended, for example, '00' indicates extending the first element, '01' indicates extending the first element and second element, '10' indicates extending the third element, and '11' indicates extending the third element and the fourth element; and ③ select one bit from the identity information sent by the UE to determine the extension factor, for example, '0' indicates '+1', and '1' indicates '−1', as shown in FIG. 12.

It is to be noted that if the type of DMRS is uncertain, another one bit needs to be selected for determining the type of DMRS, for example, '0' indicates Type 1, and '1' indicates Type 2.

The indication information is interpreted by taking an example. First it is determined that the indication information is "Type+Port+extension factor+the position of extended element". If the DMRS received by the eNodeB is Type1, the port is Port 0, and the OCC is "−1, +1, +1, +1", then the bits selected from the identity information of the UE are "0 000 00 1".

The identity information of the UE actually transmitted is reduced from 48 bits to 40 bits, and respective UEs that initiate a random access procedure at the same time have different identity information, for example, the last 4 bits of the identity information of respective UEs that initiate an access procedure at the same time are different, or the last bit of every four bits is inconsistent, which can ensure with great probability that the RSs selected by different UE are not the same, so the application of the solution not only reduces the bit rate of data and improves the reliability of transmission, but also reduces the probability of DMRS collision.

Figure 13:
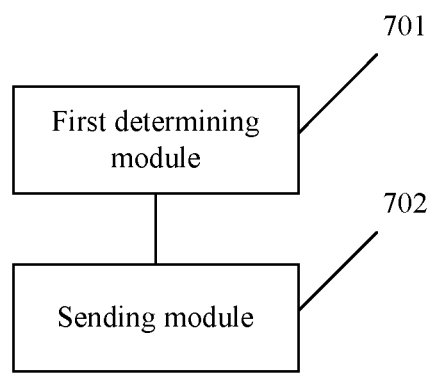
FIG. 13 is a schematic diagram of an information transmission apparatus (applied to a communication device) according to some embodiments of the present disclosure.

As shown in FIG. 13, the embodiments of the present disclosure provide an information transmission device, which is applied to a communication device and includes: a first determining module 701, configured to determine a second signal according to N bits in first information, wherein the second signal includes at least one of a preamble and an RS, and N is an integer greater than or equal to 1; and a sending module 702, configured to send an MsgA including a second signal.

In some embodiments, the first information includes at least one of: identity information of the communication device, uplink control information, and downlink beam information captured by the communication device.

In some embodiments, the first determining module 701 is further configured to select the N bits by at least one of the following ways: starting from the first bit of the first information, N consecutive bits are selected successively from front to back; starting from the last bit of the first information, N consecutive bits are selected successively from back to front; starting from the first bit of the first information, n bits are selected at intervals of δ bits from front to back until N bits are selected; starting from the last bit of the first information, n bits are selected at intervals of δ bits from back to front until N bits are selected. δ is a positive integer less than M-N and has a functional relationship with N, where n≤N-1, and M is the length of the first information.

In some embodiments, the first determining module 701 is further configured to select the N bits by at least one of the following ways: the N bits are selected from the identity information of the communication device; the N bits are selected from the uplink control information; the N bits are selected from the downlink beam information captured by the communication device; N1 bits, N2 bits and N3 bits are selected respectively from the identity information of the communication device, the uplink control information and the downlink beam information captured by the communication device. N1, N2 and N3 are integers, and the sum of N1, N2 and N3 is not greater than N.

In some embodiments, the value of N is related to at least one of a length L of the second signal, the number S of available preamble sequences and/or available RS sequences, and a length M of the first information.

In some embodiments, the value of N is determined by at least one of: the value of N is equal to a value obtained by rounding up $\log_2 L$ or rounding down $\log_2 L$; the value of N is equal to a value obtained by rounding up $\log_2 S$ or rounding down $\log_2 S$; and the value of N is not less than a value obtained by $\log_2 M$, rounding up $\log_2 M$ or rounding down $\log_2 M$.

The value of N may also follow the following rules: in cases where the number S of the sequences is a power of 2, each state of the N bits can uniquely indicate a preamble or RS sequence. In cases where the number of the sequences is in the range of $(2^{x-1}, 2^x)$ (where x-1 is equal to a value obtained by rounding down $\log_2 S$, and x is equal to the value obtained by rounding up $\log_2 S$), then there are three methods to represent the preamble or RS sequence.

1) x-1 bits are selected to determine indexes of S preambles or RS sequences, wherein every two of $2 \times (S-2^{x-1})$ preambles or RS sequences are indicated using the same x-1 bit value.
2) x bits are selected to determine indexes of S preambles or RS sequences, wherein in a case where the x bit value is greater than the maximum index value, the x bits are shifted right by one bit, and it is needed to add the indication information of 1 bit to the second signal to indicate whether the N bits are shifted right by one bit.
3) x-1 bits are selected to determine indexes of S preambles or RS sequences, wherein the x-1 bits are used for representing the first $2^{x-1}$ indexes, and the other $2\times(S-2^{x-1})$ indexes are represented by the CRC mask.

In some embodiments, the number S of the available preamble sequences and/or available RS sequences is equal to 2 to the power of m, where m is a positive integer.

In some embodiments, in a case where the second signal includes the preamble, the first determining module 701 is configured to determine the index of the preamble sequence in the sequence pool according to the N bits, and then determine the preamble according to the index.

In some embodiments, in a case where the second signal includes the RS, and the first determining module 701 is configured to determine, according to the N bits, at least one of the following information used for determining the RS: an OCC participating in generation of the RS; a type of the RS and an OCC participating in generation of the RS; a type of the RS, the CDM group identifier, and an OCC participating in generation of the RS; a port number of the RS; a type of the RS and a port number of the RS; extended RS information corresponding to the RS; and a type of the RS and extended RS information corresponding to the RS. The extended RS information includes: a port number of the RS, an extension factor of the RS, and a position of extended element of the RS.

In some embodiments, the apparatus may further include: a generating module, which is configured to process the other bits except the N bits in the first information, and generate the third signal. The MsgA further includes the third signal.

In some embodiments, the generating module is configured to encode the other bits except the N bits in the first information, modulate through the BPSK, or the π/2 BPSK, or the QPSK to obtain a modulation symbol Q, and obtain the third signal according to the modulation symbol Q.

In some other embodiments, the generating module is configured to perform coding and modulation on the other bits except the N bits in the first information to obtain a modulation symbol Q, extend the modulation symbol Q to obtain the extension block SS, and obtain the third signal according to the extension block SS.

In some embodiments, the apparatus may further include:
a monitoring module, which is configured to continuously monitor the information fed back by the communication node on the specified channel.

Through the embodiments of the present disclosure, a bit rate can be reduced, the reliability of transmission can be improved, and the collision probability of the preamble or the RS among various communication devices can be reduced.

Figure 14:
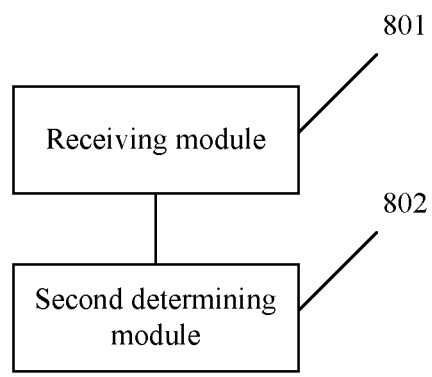
FIG. 14 is a schematic diagram of an information transmission apparatus (applied to a communication node) according to some embodiments of the present disclosure.

As shown in FIG. 14, the embodiments of the present disclosure provide an information transmission apparatus, which includes: a receiving module 801, configured to receive an MsgA including a second signal, which is sent by a communication device, wherein the second signal includes at least one of a preamble and an RS; and a second determining module 802, configured to determine information of N bits in first information of the communication device according to the second signal.

In some embodiments, the first information includes at least one of: identity information of the communication device, uplink control information, and downlink beam information captured by the communication device.

In some embodiments, the value of N is related to at least one of a length L of the second signal, the number S of available preamble sequences and/or available RS sequences, or a length M of the first information.

In some embodiments, the value of N is determined by at least one of: the value of N is equal to the value obtained by rounding up $\log_2 L$ or rounding down $\log_2 L$; the value of N is equal to the value obtained by rounding up $\log_2 S$ or rounding down $\log_2 S$; and the value of N is not less than the value obtained by $\log_2 M$, rounding up $\log_2 M$ or rounding down $\log_2 M$.

The value of N may also follow the following rules: if the number S of the sequences is a power of 2, each state of the N bits can uniquely indicate a preamble or RS sequence. In cases where the number of the sequences is in the range of $(2^{x-1}, 2^x)$ (where x-1 is equal to the value obtained by rounding down $\log_2 S$, and x is equal to the value obtained by rounding up $\log_2 S$), then there are three methods to represent the preamble or RS sequence.
1) x-1 bits are selected to determine indexes of S preambles or RS sequences, wherein every two of $2\times(S-2^{x-1})$ preambles or RS sequences are indicated using the same x-1 bit value. 2) x bits are selected to determine indexes of S preambles or RS sequences, wherein in a case where the x bit value is greater than the maximum index value, the x bits are shifted right by one bit, and it is needed to add the indication information of 1 bit to the second signal to indicate whether the N bits are shifted right by one bit.
3) x-1 bits are selected to determine indexes of S preambles or RS sequences, wherein the x-1 bits are used for representing the first $2^{x-1}$ indexes, and the other $2\times(S-2^{x-1})$ indexes are represented by the CRC mask.

In some embodiments, in a case where the second signal includes the preamble, and the second determining module 802 is configured to determine the index of the corresponding preamble sequence according to the preamble, and determine the information of the N bits according to the index.

In some embodiments, in a case where the second signal includes the RS, and the second determining module 802 is configured to determine at least one of the following information according to the second signal, so as to determine the information of the N bits: an OCC participating in generation of the RS; a type of the RS and an OCC participating in generation of the RS; a type of the RS, the CDM group identifier, and an OCC participating in generation of the RS; a port number of the RS; a type of the RS and a port number of the RS; extended RS information corresponding to the RS; and a type of the RS and extended RS information corresponding to the RS. The extended RS information includes: a port number of the RS, an extension factor of the RS, and a position of extended element of the RS.

In some embodiments, the MsgA further includes the third signal generated according to the other bits except the N bits in the first information. The second determining module 802 is further configured to determine the first information according to the third signal and the information of the N bits.

In some embodiments, the second determining module 802 is further configured to determine the MsgB according to the first information, wherein the MsgB includes identity information of the communication device and time synchronization information. The apparatus may further include: a feedback module, which is configured to send the MsgB to the communication device.

Through the embodiments of the present disclosure, the bit rate can be reduced, the reliability of transmission can be improved, and the collision probability of the preamble or the RS among various communication devices can be reduced.

Figure 15:
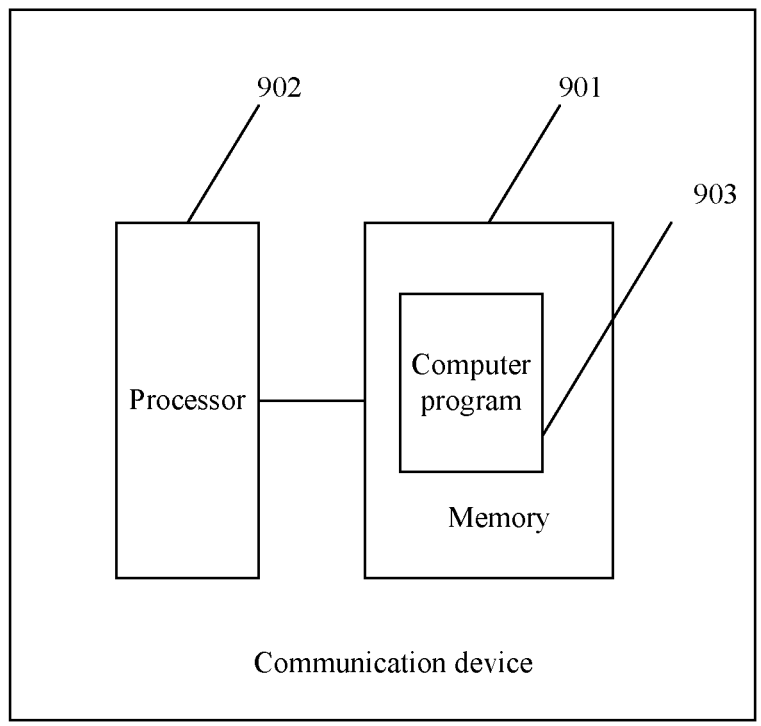
FIG. 15 is a schematic diagram of a communication device according to some embodiments of the present disclosure.

As shown in FIG. 15, the embodiments of the present disclosure provide a communication apparatus, which includes: a memory 901, a processor 902 and a computer program 903 which is stored on the memory 901 and capable of running on the processor 902. The processor 902 is configured to implement the information transmission method when executing the program.

Figure 16:
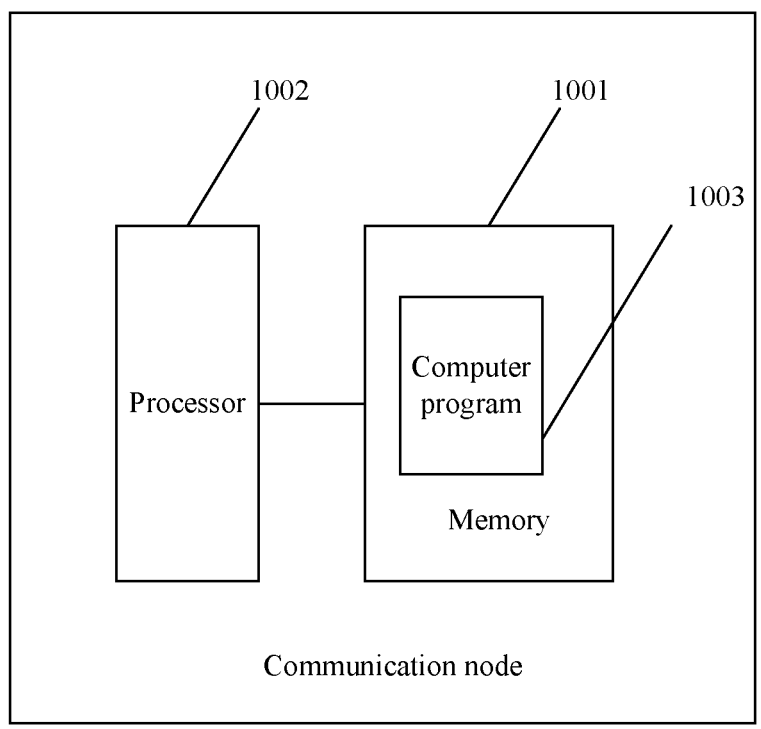
FIG. 16 is a schematic diagram of a communication node according to some embodiments of the present disclosure.

As shown in FIG. 16, the embodiments of the present disclosure provide a communication node, which includes: a memory 1001, a processor 1002 and a computer program 1003 which is stored on the memory 1001 and capable of running on the processor 1002. The processor 1002 is configured to implement the information transmission method when executing the program.

The embodiments of the present disclosure provide a computer-readable storage medium storing a computer-executable instruction. The computer-executable instruction is used for performing the information transmission method.

In the embodiments, the storage media may include, but not limited to, a Universal Serial Bus (USB) flash disk, a Read-Only Memory (ROM), a Random Access Memory (RAM), a mobile hard disk, a magnetic disk, a compact disc, and other media capable of storing the program codes.

Those of ordinary skill in the art may understand that all or some of the operations in the above method disclosed, the system, the functional modules/units in the apparatus may be implemented as software, firmware, hardware and a proper combination of them. In an implementation of hardware, the division among the functional modules/units mentioned in the above description does not necessarily correspond to the division of physical units; for example, a physical component may have multiple functions, or a function or operation may be performed by several physical components in coordination. Some or all of the components may be implemented as software performed by a processor, for example, software of a digital signal processor or a microprocessor, or implemented as hardware, or implemented as an integrated circuit, for example, an application-specific integrated circuit. Such software may be distributed on computer-readable media. The computer-readable media may include computer storage media (or non-temporary media) and communication media (or temporary media). As those of ordinary skill in the art know, the term computer storage media include volatile and non-volatile media, and removable and un-removable media which are implemented in any method or technology for storing information (such as a computer-readable instruction, a data structure, a program module or other data). The computer storage media include, but not limited to, a RAM, a ROM, an Electrically Erasable Programmable Read-Only Memory (EEPROM), a flash memory or other memory technologies, a Compact Disc Read-Only Memory (CD-ROM), a Digital Video Disk (DVD) or other optical storage, a cartridge, a tape, a disk storage or other magnetic storage devices, or any other media which may be used for storing expected information and may be accessed by a computer. Moreover, as those of ordinary skill in the art know, the communication media generally include the computer-readable instruction, the data structure, the program module or other data, such as carriers or other transmission mechanisms, in a modulation data signal, and may include any information delivery media.

What is claimed is:

1. An information transmission method, comprising:
 determining, by a communication device, a second signal according to N bits in first information, wherein the second signal comprises at least one of a preamble and a Reference Signal (RS), and N is an integer greater than or equal to 1; and
 sending, by the communication device, a message A comprising the second signal and a third signal;
 wherein the third signal is obtained based on an extension block Z, the extension block Z is generated by encoding and modulating the remaining bits after removing N bits from the first information to obtain a modulation symbol Q, and then expanding the modulation symbol Q;
 wherein the first information comprises at least one of: identity information of the communication device, uplink control information, and downlink beam information captured by the communication device,
 wherein determining the second signal according to the N bits in the first information comprises: determining an index of a preamble sequence in a sequence pool according to the N bits in the first information, and determining the preamble according to the index.

2. The method according to claim 1, wherein before determining, by the communication device, the second signal according to the N bits in the first information, the method further comprises selecting, by the communication device, the N bits by at least one of the following methods:
 selecting the N bits from the identity information of the communication device;
 selecting the N bits from the uplink control information;
 selecting the N bits from the downlink beam information captured by the communication device; and
 selecting N1 bits, N2 bits and N3 bits respectively from the identity information of the communication device, the uplink control information and the downlink beam information captured by the communication device, wherein N1, N2 and N3 are integers, and the sum of N1, N2 and N3 is not greater than N.

3. The method according to claim 1, wherein the value of N is related to at least one of: a length L of the second signal, the number S of at least one of available preamble sequences and available RS sequences, and a length M of the first information.

4. The method according to claim 3, wherein the value of N is determined by at least one of:
 the value of N is equal to a value obtained by rounding up $\log_2 L$ or rounding down $\log_2 L$;
 the value of N is equal to a value obtained by rounding up $\log_2 S$ or rounding down $\log_2 S$; and
 the value of N is not less than a value obtained by rounding up $\log_2 M$ or rounding down $\log_2 M$;
 or,
 the number S of at least one of the available preamble sequences and the available RS sequences is equal to 2 to the power of m, where m is a positive integer.

5. The method according to claim 1, wherein
 in a case where the second signal comprises the RS, determining the second signal according to the N bits in the first information comprises:
 determining, according to the N bits in the first information, at least one of the following information used for determining the RS:
 an Orthogonal Cover Code (OCC) participating in generation of the RS;
 a type of the RS and an OCC participating in generation of the RS;
 a type of the RS, a Code Division Multiplexing (CDM) group identifier of the RS, and an OCC participating in generation of the RS;

a port number of the RS;
a type of the RS and a port number of the RS;
extended RS information corresponding to the RS; and
a type of the RS and extended RS information corresponding to the RS;
wherein the extended RS information comprises: a port number of the RS, an extension factor of the RS, and a position of extended element of the RS.

6. The method according to claim 1, wherein processing, by the communication device, the other bits except the N bits in the first information to generate the third signal comprises:
encoding, by the communication device, the other bits except the N bits in the first information, modulating the encoded bits through Binary Phase Shift Keying (BPSK), or π/2 BPSK, or Quadrature Phase Shift Keying (QPSK) to obtain a modulation symbol Q, and obtaining the third signal according to the modulation symbol Q.

7. The method according to claim 1, wherein sending, by the communication device, the message A comprising the second signal comprises:
sending, by the communication device, the message A comprising the second signal to a communication node; and
after sending, by the communication device, the message A comprising the second signal to the communication node, the method further comprises:
continuously monitoring, by the communication device, information fed back by the communication node on a specified channel.

8. An information transmission method, comprising:
receiving, by a communication node, a message A comprising a second signal, which is sent by a communication device, wherein the second signal comprises at least one of a preamble and a Reference Signal (RS);
determining, by the communication node, information of N bits in first information of the communication device according to the second signal, wherein N is an integer greater than or equal to 1,
wherein the message A further comprises a third signal, the extension block Z is generated by encoding and modulating the remaining bits after removing N bits from the first information to obtain a modulation symbol Q, and then expanding the modulation symbol Q;
determining, by the communication node, the first information according to the third signal and information of the N bits;
wherein the first information comprises at least one of: identity information of the communication device, uplink control information, and downlink beam information captured by the communication device;
wherein determining, by the communication node, the information of the N bits in the first information of the communication device according to the second signal comprises: determining, by the communication node according to the preamble, an index of a preamble sequence corresponding to the preamble, and determining, by the communication node, the information of the N bits according to the index.

9. The method according to claim 8, wherein the value of N is related to at least one of: a length L of the second signal, the number S of at least one of available preamble sequences and available RS sequences, and a length M of the first information.

10. The method according to claim 9, wherein the value of N is determined by at least one of:
the value of N is equal to a value obtained by rounding up $\log_2 L$ or rounding down $\log_2 L$;
the value of N is equal to a value obtained by rounding up $\log_2 S$ or rounding down $\log_2 S$; and
the value of N is not less than a value obtained by rounding up $\log_2 M$ or rounding down $\log_2 M$.

11. The method according to claim 8, wherein
in a case where the second signal comprises the RS, determining, by the communication node, the information of the N bits in the first information of the communication device according to the second signal comprises:
determining, by the communication node according to the second signal, at least one of the following information used for determining the information of the N bits:
an Orthogonal Cover Code (OCC) participating in generation of the RS;
a type of the RS and an OCC participating in generation of the RS;
a type of the RS, a Code Division Multiplexing (CDM) group identifier of the RS, and an OCC participating in generation of the RS;
a port number of the RS;
a type of the RS and a port number of the RS;
extended RS information corresponding to the RS; and
a type of the RS and extended RS information corresponding to the RS;
wherein the extended RS information comprises: a port number of the RS, an extension factor of the RS, and a position of extended element of the RS.

12. The method according to claim 8, wherein after determining, by the communication node, the first information according to the third signal and the information of the N bits, the method further comprises:
determining, by the communication node, a message B according to the first information, wherein the message B comprises identity information of the communication device and time synchronization information; and
sending, by the communication node, the message B to the communication device.

13. An information transmission apparatus, comprising a memory storing instructions and a processor in communication with the memory, wherein the processor is configured to execute the instructions to:
determine a second signal according to N bits in first information, wherein the second signal comprises at least one of a preamble and a Reference Signal (RS), and N is an integer greater than or equal to 1; and
send a message A comprising the second signal and a third signal;
wherein the third signal is obtained based on an extension block Z, the extension block Z is generated by encoding and modulating the remaining bits after removing N bits from the first information to obtain a modulation symbol Q, and then expanding the modulation symbol Q;
wherein the first information comprises at least one of: identity information of the communication device, uplink control information, and downlink beam information captured by the communication device,
wherein determine the second signal according to N bits in first information comprises: determining an index of a preamble sequence in a sequence pool according to the N bits in the first information, and determining the preamble according to the index.

14. An information transmission apparatus, comprising a memory storing instructions and a processor in communication with the memory, wherein the processor is configured to execute the instructions to perform the method according to claim 8.

15. A non-transitory computer-readable storage medium, storing a computer-executable instruction, wherein the computer-executable instruction is used for performing the information transmission method according to claim 1.

* * * * *